Nov. 1, 1932.  R. J. NACHTIGALL  1,885,754
SELF SHARPENING AND BALANCING SHEARS OR SCISSORS
Filed June 29, 1932
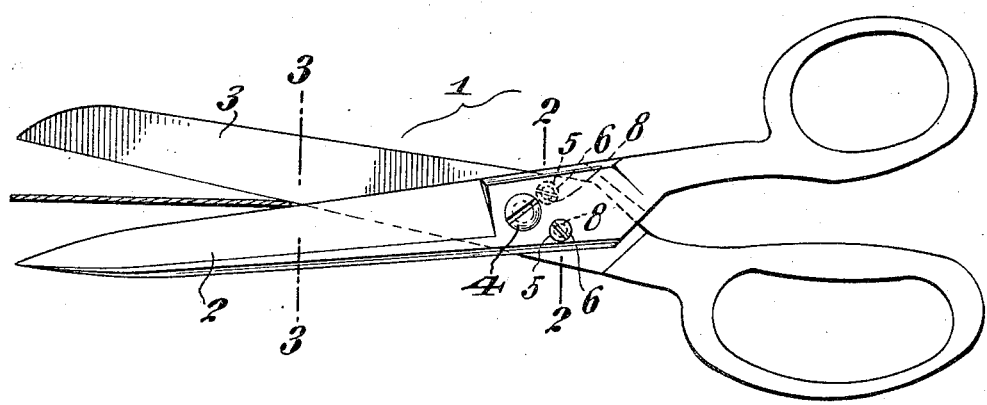
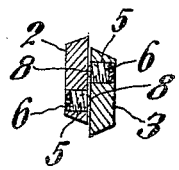
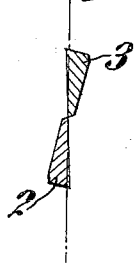
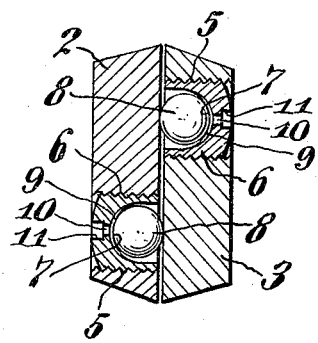
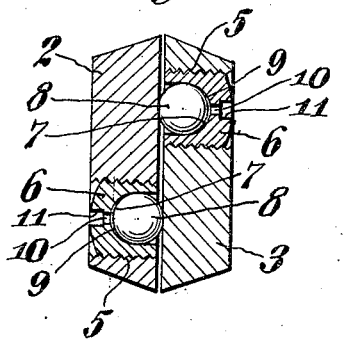
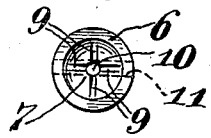
Richard J. Nachtigall,
INVENTOR
BY Victor J. Evans
ATTORNEY Patented Nov. 1, 1932

1,885,754

UNITED STATES PATENT OFFICE

RICHARD J. NACHTIGALL, OF PHILADELPHIA, PENNSYLVANIA, ASSIGNOR OF ONE-HALF TO ANDREW PECSI, OF PHILADELPHIA, PENNSYLVANIA

SELF-SHARPENING AND BALANCING SHEARS OR SCISSORS

Application filed June 29, 1932. Serial No. 620,000.

The present invention relates to an improved pair of shears or scissors having the characteristics of being self-sharpening, and through the medium of adjustable means carried by both blades of the shears or scissors including ball bearings, the blades are uniformly balanced throughout their life, as well as retained uniformly sharpened, said means being capable of manual adjustment to accommodate the cutting edges of the blades to the character of material to be cut.

The invention has for its purpose to provide means carried by both blades of the shears or scissors out of arcuate register so that ball bearings carried by said means will not interfere with or contact with each other at no time during the operation of the shear blades, and yet at the same time to impart a twisting action to the blades respectively, to not only equally balance the blades, but to keep them continually sharpened during the life of the shears.

Another purpose is to provide, in a pair of shears identical means which can be applied to both blades of a pair of shears or scissors now in use or on the market, or can be applied to shears or scissors or similar instruments at the time of their manufacture. However it is most essential to purchase shears or scissors which are now manufactured, and equip the blades thereof with the improved means in question.

It is to be understood that the particulars herein given are in no way limitative, and that while still keeping within the scope of the invention, any desired modification of details and proportions may be made in the construction of the appliance according to circumstances.

The invention comprises further features and combination of parts to be hereinafter set forth, shown in the drawing and claimed.

In the drawing:—

Figure 1 is a view in elevation of a pair of shears or scissors equipped with the improved means for causing twists to be imparted to the shear blades for self-sharpening the edges as well as balancing the blades.

Figure 2 is a sectional view on line 2—2 of Figure 1.

Figure 3 is a sectional view on line 3—3 of Figure 1.

Figure 4 is a view similar to Figure 2 on an enlarged scale and also showing the cups in section.

Figure 5 is a plan view of one of the cups showing the seat in the bottom illustrating the oil grooves.

Figure 6 is a view similar to a portion of Figure 4 showing a modified construction of the seat for a ball bearing.

Referring to the drawing 1 identifies a pair of shears or scissors as a whole, which comprises the two blades 2 and 3, which are fastened pivotally together by means of a rivet 4.

The blades are of the usual design and construction, and constructed in each blade is an internally threaded opening 5. These openings are offset from the rivet or pivot 4 remotely from opposite sides. Furthermore these openings 5 are arcuately out of register, so that when the shear blades are opened a substantial distance the openings, while they will approach a registering position, will remain out of register, but when the shear blades are closed the openings are remotely out of register with each other.

Engaged in each opening 5 is an externally threaded cup 6 which has an internal seat 7 for the reception of a case hardened steel ball or spherical member 8. It will be noted that this seat 7 at its bottom is provided with oil ways 9 merging from an opening or oil hole 10, so as to feed lubricant to the surface of the steel ball as well as to the seat, the seat being constructed on a larger radius than the ball, so as to insure and permit a rolling movement of the ball. The opening or oil hole 10 is formed in the center of the cup at the bottom of the seat adjacent where a slot 11 for the reception of the end of a screw driver is formed. Through this hole or opening 10 it is possible to inject sufficient lubricant for the purpose of lubricating the ball and insure freedom thereof. By constructing the seat 7 on a radius larger than the diameter of the ball it is possible to more readily insure against causing flat faces to appear on the ball. However it is possible to construct the seat 7 of the same radius as the ball, as is shown in Figure 6.

As shown in Figures 1 and 2 it is obvious that these steel ball carrying cups are located out of arcuate register, so as to avoid registering with each other when the shear blades are open and also to insure imparting a twisting action to the blades to retain the cutting edges in their relative close contact self-sharpening positions.

By engaging a screw driver with the groove or slot 11 it is possible to adjust each of the cups, so as to increase or decrease the action of the steel balls against the opposite faces of the shear blades, and thereby regulate the contacting of the cutting edges as well as equally balancing the blades relative to each other.

The invention having been set forth, what is claimed is:

1. In a pair of shears or scissors, a pair of shear blades pivotally united, ball bearings with means for mounting the same in both blades, said ball bearings and their mountings being arcuately out of register at all times when the blades are closed or open, thereby imparting a twisting action to the respective blades to retain their cutting edges in constant contact.

2. In a pair of shears or scissors, a pair of shear blades pivotally united, ball bearings with means for mounting the same in both blades, said ball bearings and their mountings being arcuately out of register at all times when the blades are closed or open, thereby imparting a twisting action to the respective blades to retain their cutting edges in constant contact, said mounting means being adjustable, for regulating the contact of the cutting edges and equal balancing of the blades.

3. In a pair of shears or scissors, a pair of shear blades pivotally united, ball bearings with means for mounting the same in both blades, said ball bearings and their mountings being arcuately out of register at all times when the blades are closed or open, thereby imparting a twisting action to the respective blades to retain their cutting edges in constant contact, said mounting means comprising an exteriorly threaded cup provided with an oil hole in its bottom for feeding lubricant to the ball bearing.

4. In a pair of shears or scissors, a pair of shear blades pivotally united, ball bearings with means for mounting the same in both blades, said ball bearings and their mountings being arcuately out of register at all times when the blades are closed or open, thereby imparting a twisting action to the respective blades to retain their cutting edges in constant contact, said mounting means being adjustable, for regulating the contact of the cutting edges and equal balancing of the blades, said mounting means comprising an exteriorly threaded cup threaded through the shear blade and provided with a seat for the ball bearing, said cup having an oil hole in its bottom to feed lubricant to the seat and the ball bearing.

In testimony whereof I affix my signature.

RICHARD J. NACHTIGALL.